J. P. Brady,
Millstone Pick.
N° 21,184.   Patented Aug. 17, 1858.
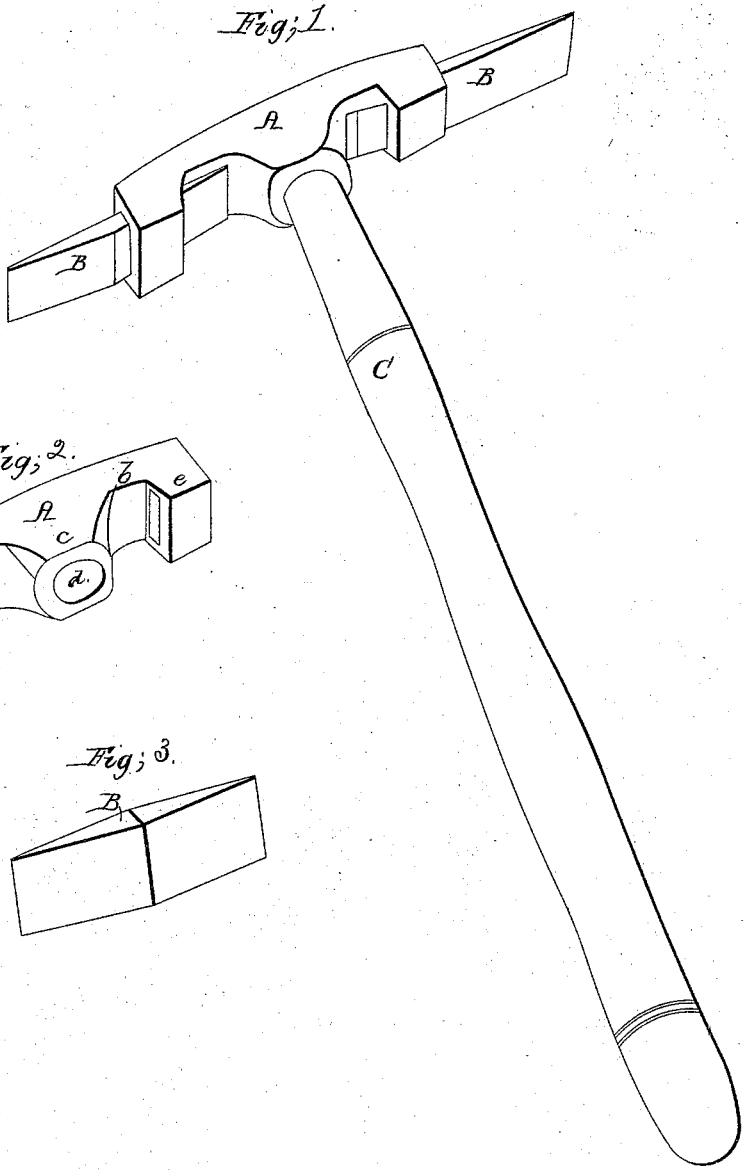
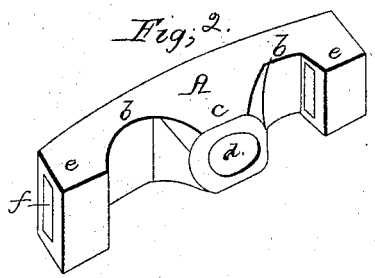
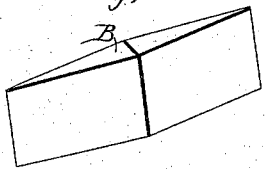
Witnesses;
Jacob Stauffer
F. H. Stauffer
Inventor;
Jacob P. Brady

UNITED STATES PATENT OFFICE.

J. P. BRADY, OF MOUNT JOY, PENNSYLVANIA.

MILL-PICK HOLDER.

Specification of Letters Patent No. 21,184, dated August 17, 1858.

*To all whom it may concern:*

Be it known that I, JACOB P. BRADY, of the borough of Mount Joy, in the county of Lancaster and State of Pennsylvania, have invented a new and useful Improvement in Mill-Picks; and I do hereby declare that the following is a full, clear, and exact description of the construction and operation of the same, reference being had to the annexed drawings, making a part of this specification.

The nature of my invention consists in a peculiar construction of the double socket pick holder, whereby the diamond shaped picks are held firmly in place without the aid of screws, bolts, or other appliances.

Figure 1 is a perspective view of my self fastening double socket and double bitted mill pick; A the double socket with its handle C and two double wedged picks B, B, in place; Fig. 2 the double socket, which may be hollowed out as shown at $b$, $b$, or left full in a line with $e$, $e$, the bit holders and $c$ for the handle C at D; Fig. 3 one of the double wedged pick blades fitting into the slots $f$ in the pick holder A, made of various sizes or lengths as may be deemed desirable, both ends of the pick-blades being alike fitted for picking or being fastened into the socket, their beveled sides firmly wedging them when in use, and the worn or blunted end can be readily turned, a tap of a hammer being sufficient to loosen them, thus affording the operator the use of four blades in one holder, said holder being of sufficient strength and durability for any number of blades or bits, there being no wear upon it further than the mere concussion while in use, thus doing away with screw fastenings and fixings, so liable to wear and get out of repair.

What I claim as my invention and desire to secure by Letters Patent is,

The double socket pick holder, when constructed as described and used in combination with the diamond shaped picks in the manner and for the purposes set forth.

JACOB P. BRADY.

Witnesses at signing:
 JACOB STAUFFER,
 F. H. STAUFFER.